(12) United States Patent
Ohlsson et al.

(10) Patent No.: US 10,234,321 B2
(45) Date of Patent: Mar. 19, 2019

(54) RADAR LEVEL GAUGE SYSTEM WITH SINGLE PROPAGATION MODE FEED-THROUGH

(71) Applicant: Rosemount Tank Radar AB, Mölnlycke (SE)

(72) Inventors: Magnus Ohlsson, Norsholm (SE); Peter Elmberg, Molndal (SE)

(73) Assignee: ROSEMOUNT TANK RADAR AB, Molnlycke (SE)

( * ) Notice: Subject to any disclaimer, the term of this patent is extended or adjusted under 35 U.S.C. 154(b) by 315 days.

(21) Appl. No.: 15/204,194

(22) Filed: Jul. 7, 2016

(65) Prior Publication Data

US 2018/0010949 A1    Jan. 11, 2018

(51) Int. Cl.
*G01F 23/284*    (2006.01)
(52) U.S. Cl.
CPC ................... *G01F 23/284* (2013.01)
(58) Field of Classification Search
CPC .................................................... G01F 23/284
USPC ......................................................... 342/124
See application file for complete search history.

(56) References Cited

U.S. PATENT DOCUMENTS

| | | | |
|---|---|---|---|
| 5,279,156 A | 1/1994 | van der Pol | |
| 5,770,990 A | 6/1998 | Lubbers | |
| 5,872,494 A * | 2/1999 | Palan | G01F 23/284 |
| | | | 333/252 |
| 5,926,080 A * | 7/1999 | Palan | H01P 1/08 |
| | | | 324/642 |
| 6,619,117 B1 * | 9/2003 | Reimelt | G01F 23/284 |
| | | | 73/219 |

(Continued)

FOREIGN PATENT DOCUMENTS

| | | | | |
|---|---|---|---|---|
| EP | 1 083 414 | | 3/2001 | |
| EP | 1083414 A1 * | | 3/2001 | G01F 23/284 |

(Continued)

OTHER PUBLICATIONS

Notification of Transmittal of the International Search Report and the Written Opinion of the International Searching Authority from PCT/EP2017/064087, dated Aug. 17, 2017.

*Primary Examiner* — Frank J McGue
(74) *Attorney, Agent, or Firm* — Westman, Champlin & Koehler, P.A.

(57) ABSTRACT

A radar level gauge system, comprising a transceiver; an antenna; a feed-through connecting the transceiver and the antenna; and processing circuitry coupled to the transceiver. The feed-through comprises a first waveguide section comprising a dielectric plug sealingly arranged in a cylindrical first hollow conductor section having a diameter selected for single mode propagation; a second waveguide section arranged between the transceiver and the first waveguide section and comprising a cylindrical second hollow conductor section having a second diameter selected for single mode propagation, a third waveguide section arranged between the antenna and the first waveguide section comprising a cylindrical third hollow conductor section having a third diameter selected for single mode propagation; a first impedance matching waveguide section arranged between the first waveguide section and the second waveguide section, and a second impedance matching waveguide section arranged between the first waveguide section and the third waveguide section.

29 Claims, 10 Drawing Sheets

(56) References Cited

U.S. PATENT DOCUMENTS

| | | |
|---|---|---|
| 7,952,514 B2 | 5/2011 | Nilsson |
| 8,477,064 B2 | 7/2013 | Nilsson |
| 8,688,279 B2 | 4/2014 | Nilsson et al. |
| 8,763,453 B2 | 7/2014 | Reimelt |
| 8,970,395 B2 | 3/2015 | Nilsson et al. |
| 2002/0066314 A1 | 6/2002 | Lubbers |
| 2002/0067229 A1 | 6/2002 | Lubbers |
| 2014/0007674 A1 | 1/2014 | Weinzierle et al. |
| 2015/0168201 A1* | 6/2015 | Cobianu ............... G01F 23/284 342/124 |

FOREIGN PATENT DOCUMENTS

| | | | |
|---|---|---|---|
| EP | 1 211 490 | 6/2002 | |
| EP | 2023097 A1 * | 2/2009 | ........... G01F 23/284 |
| EP | 2 023 097 | 11/2009 | |

* cited by examiner

RADAR LEVEL GAUGE SYSTEM WITH SINGLE PROPAGATION MODE FEED-THROUGH

TECHNICAL FIELD OF THE INVENTION

The present invention relates to a radar level gauge system and to a method of manufacturing a feed-through for a radar level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a transmission line probe acting as a waveguide. The probe is generally arranged to extend vertically from the top towards the bottom of the tank.

An electromagnetic transmit signal is generated by a transceiver and propagated towards the surface of the product in the tank, and an electromagnetic reflection signal resulting from reflection of the transmit signal at the surface is propagated back towards to the transceiver.

Based on a relation between the transmit signal and the reflection signal, the distance to the surface of the product can be determined.

Radar level gauge systems are ubiquitous in application areas involving handling, shipping and storing of products as well as, for example, in the chemical process industry.

Since products to be monitored and/or measured are often flammable, special safety requirements exist for equipment, such as radar level gauge systems or at least parts thereof that are positioned within a so-called hazardous area. Such equipment generally needs to be certified as either explosion-proof or intrinsically safe.

For instance, the radar level gauge system may need to be designed to ensure that an explosion inside the housing for the measurement electronics does not result in ignition of flammable material inside the tank. To that end, a feed-through connecting the measurement electronics arranged outside the tank with an antenna in the interior of the tank may need to fulfill certain requirements, such as those detailed by international standard IEC 60079-1 or similar standards.

U.S. Pat. No. 8,763,453 discloses an arrangement for measuring a fill level of a fill substance in a container, with a gastight feedthrough between the outside and the inside of the container.

According to U.S. Pat. No. 8,763,453, the gas tight feedthrough comprises a hollow conductor with a microwave transparent window inserted gas tightly into the hollow conductor. The window includes a planar disk that has a thickness corresponding approximately to a half wavelength or a small integer multiple times the half wavelength of the microwave signals at a predetermined signal frequency in the disk. In order to increase the bandwidth over which the transition through the feedthrough is as low reflection as possible, a matching layer is provided on the two oppositely lying outer surfaces of the disk. Each matching layer has a thickness corresponding to a fourth of the wavelength of the microwave signals at the predetermined signal frequency in the matching layer. According to U.S. Pat. No. 8,763,453, each matching layer preferably has a dielectric constant equaling a square root of the product of the dielectric constant of the disk and the dielectric constant of the hollow conductor above or below the disk.

U.S. Pat. No. 8,763,453 further discloses that, in applications in which only a single microwave mode is to be sent and received, the feedthrough with rectangular cross-section is combined with an antenna with a circular disk shaped cross section, with a transition element arranged between the feedthrough and the antenna.

The arrangement according to U.S. Pat. No. 8,763,453 appears to be rather complicated and relatively costly.

SUMMARY OF THE INVENTION

In view of the above, a general object of the present invention is to provide an improved radar level gauge system.

According to a first aspect of the present invention, it is therefore provided a radar level gauge system for determining the filling level of a product in a tank, comprising: a transceiver for generating, transmitting and receiving electromagnetic signals having frequencies defining a frequency bandwidth; an antenna for radiating an electromagnetic transmit signal towards a surface of the product and for returning an electromagnetic reflection signal resulting from reflection of the electromagnetic transmit signal at the surface back towards the transceiver; a feed-through connecting the transceiver and the antenna; and processing circuitry coupled to the transceiver for determining the filling level based on a relation between the transmit signal and the reflection signal. The feed-through comprises: a first waveguide section comprising a dielectric plug sealingly arranged in a cylindrical first hollow conductor section, the dielectric plug having a first dielectric constant, and the first hollow conductor section having a first hollow conductor diameter selected to only allow propagation in a single propagation mode through the first waveguide section for the frequency bandwidth; a second waveguide section arranged between the transceiver and the first waveguide section to receive the transmit signal from the transceiver and guide the transmit signal towards the first waveguide section, the second waveguide section comprising a cylindrical second hollow conductor section enclosing a material having a second dielectric constant being lower than the first dielectric constant, wherein the second hollow conductor section has a second hollow conductor diameter, greater than the first hollow conductor diameter, selected to only allow propagation in the single propagation mode through the second waveguide section for the frequency bandwidth; a third waveguide section arranged between the antenna and the first waveguide section to receive the transmit signal from the first waveguide section and guide the transmit signal towards the antenna, the third waveguide section comprising a cylindrical third hollow conductor section enclosing a material having a third dielectric constant being lower than the first dielectric constant, wherein the third hollow conductor section has a third hollow conductor diameter, greater than the first hollow conductor diameter, selected to only allow propagation in the single propagation mode through the third waveguide section for the frequency bandwidth; a first impedance matching waveguide section arranged between the first waveguide section and the second waveguide section, the first impedance matching waveguide section comprising a dielectric first impedance matching member in direct abutment with a first end of the dielectric plug comprised in the first waveguide section, the first impedance matching member having a fourth dielectric constant being lower than the first dielectric constant and higher than the second dielectric constant; and a second impedance matching waveguide section arranged between the first waveguide section and the third waveguide section, the second impedance matching waveguide section comprising a dielectric second impedance matching member in direct abutment with a second end of the dielectric plug comprised in the first waveguide section, the second impedance matching member having a fifth dielectric constant being lower than the first dielectric constant and higher than the third dielectric constant.

The dielectric plug may, for example, be made of glass or a suitable ceramic. In particular for relatively high frequencies, glass may be preferable, since glass has a lower relative dielectric constant than suitable ceramic materials.

That the dielectric plug is "sealingly arranged" in the cylindrical first hollow conductor section should be understood to mean that the interface between the inner surface of the first hollow conductor section and the dielectric plug is gas tight. Advantageously, the dielectric-metal interface between the first hollow conductor section and the dielectric plug may fulfil the requirements of applicable standards, such as the above-mentioned international standard IEC 60079-1.

Depending on the way the dielectric plug is sealingly arranged in the cylindrical first hollow conductor section, the dielectric-metal interface may need to extend along different longitudinal distances. For instance, the dielectric-metal interface may extend, along the axial direction of the first hollow conductor section, by at least 3 millimeters.

The dielectric plug may completely fill the first hollow waveguide section, so that the interface between the inner surface of the first hollow conductor section and the dielectric plug extends along the entire length of the first hollow conductor section.

The "transceiver" may be one functional unit capable of transmitting and receiving electromagnetic signals, or may be a system comprising separate transmitter and receiver units.

It should be noted that the processing circuitry may be provided as one device or several devices working together.

The electromagnetic transmit signal may advantageously be a microwave signal. For instance, the transmit signal may be frequency and/or amplitude modulated on a carrier in the microwave frequency range.

Examples of antennas include a horn antenna, a rod antenna, an array antenna and a parabolic antenna, etc.

The present invention is based on the realization that an explosion proof feed-through supporting single mode propagation can be achieved through suitable selection of the diameters of the different cylindrical hollow waveguide sections, and providing dielectric impedance matching members in direct abutment with the sealing dielectric plug.

Embodiments of the present invention thus enable fulfillment of the requirements for zone separation (flameproof feed-through), while at the same time providing for single mode propagation through the feed-through in combination with an acceptably low signal loss due to signal reflection inside the feed-through.

Single mode propagation, also for a rather large bandwidth, is desirable to improve the measurement performance of the radar level gauge, in particular to allow reliable detection of weak echoes.

An example frequency range for the electromagnetic transmit signal may be about 24 GHz to about 27 GHz.

In embodiments of the present invention the second dielectric constant may be substantially identical to the third dielectric constant, and the fourth dielectric constant may be substantially identical to the fifth dielectric constant.

According to various embodiments of the present invention, the first impedance matching waveguide section may comprise a cylindrical fourth hollow conductor section with a fourth hollow conductor diameter; and the second impedance matching waveguide section may comprise a cylindrical fifth hollow conductor section with a fifth hollow conductor diameter. The fourth hollow conductor diameter may be greater than the first hollow conductor diameter and smaller than the second hollow conductor diameter; and the fifth hollow conductor diameter may be greater than the first hollow conductor diameter and smaller than the third hollow conductor diameter.

Through the provision of these hollow conductor sections with intermediate diameters, single mode propagation across a greater bandwidth is provided for. In particular, the fourth hollow conductor diameter may be adapted to the fourth dielectric constant of the first impedance matching member, and the fifth hollow conductor diameter may be adapted to the fifth dielectric constant of the second impedance matching member to provide substantially the same cut-off frequency in the impedance matching waveguide sections as in the first, second and third waveguide sections.

According to various embodiments, the first impedance matching member may comprise a portion exhibiting a decreasing diameter with increasing distance from the first end of the dielectric plug; and the second impedance matching member may comprise a portion exhibiting a decreasing diameter with increasing distance from the second end of the dielectric plug.

Hereby, a gradual transition of the effective impedance seen by the microwaves traveling through the feed-through can be achieved, which provides for a further reduction of unwanted signal reflection inside the feed-through.

For instance, one or both of the impedance matching members may be conical or frusto-conical. Furthermore, the lateral dimension of one or both of the impedance matching members may be continuous or in steps.

To further increase the bandwidth for which single mode propagation can be achieved, at least one of the first and second impedance matching waveguide sections may comprise a mode filter for suppressing propagation in other modes than the single propagation mode.

The mode filter may advantageously comprise a metal pin embedded in at least one of the first impedance matching member and the second impedance matching member. The metal pin may extend along the symmetry axis of the waveguide sections of the feed-through.

According to various embodiments, furthermore, the first impedance matching member may comprise a first polymer material, and the second impedance matching member may comprise a second polymer material.

The first and second impedance matching members may advantageously comprise the same polymer material. A suitable choice of polymer material may be a material that is resistant to various chemicals and substantially does not cold flow. One such suitable polymer material is PEEK (polyether ether ketone).

To provide for the desired direct abutment between the first and second impedance matching members and the respective ends of the dielectric plug, the impedance matching members may be pressed against the ends of the dielectric plug. This has been found to be a convenient way of reducing the risk of unwanted material between the dielectric plug and one or both of the impedance matching members. If, for example, water were to be allowed to enter between the dielectric plug and one or both of the impedance matching members, strong attenuation of the microwave signals would occur.

The dielectric plug may advantageously have planar first and second ends, which may be polished, and the impedance matching members may have planar surfaces facing the first and second ends, respectively, of the dielectric plug.

In embodiments, the dielectric plug may be sealingly arranged in the first hollow conductor section in such a way that a physical or chemical bond is formed between the dielectric plug and the first hollow conductor.

The physical or chemical bond may extend at least three millimeters along an axial direction of the first waveguide section.

The physical or chemical bond may extend less than 10 millimeters along the axial direction of the first waveguide section.

In embodiments, the dielectric plug may be a glass plug fused to an inner surface of the first hollow conductor section to form a glass-to-metal seal between the glass plug and the first hollow conductor. This glass-to-metal seal may be at least 3 millimeters in the axial direction.

To conveniently provide for the desired single seal between the electronic devices comprised in the radar level gauge system and the interior of the tank, the first hollow conductor section may be mechanically connected to the second hollow conductor section by a first weld; and the second hollow conductor section may be mechanically connected to the third hollow conductor section by a second weld.

The first and second welds may advantageously be continuous welds. For instance, the first and second welds may be formed by laser welding to a depth of at least 1 millimeter.

Advantageously, the feed-through may provide a microwave passage in combination with at least one of the structures selected from the group consisting of a flameproof housing structure according to the standard IEC 60079-1 or corresponding; a zone-separation between equipment protection levels Ga and Gb according to the standard IEC 60079-0; and a single seal according to the standard ANSI/ISA-12.27.01-2011.

According to a second aspect of the present invention, it is provided a radar level gauge system for determining the filling level of a product in a tank, comprising: a transceiver for generating, transmitting and receiving electromagnetic signals having frequencies defining a frequency bandwidth; an antenna for radiating an electromagnetic transmit signal towards a surface of the product and for returning an electromagnetic reflection signal resulting from reflection of the electromagnetic transmit signal at the surface back towards the transceiver; a feed-through connecting the transceiver and the antenna; and processing circuitry coupled to the transceiver for determining the filling level based on a relation between the transmit signal and the reflection signal, wherein the feed-through comprises: a first waveguide section comprising a dielectric plug sealingly arranged in a first hollow conductor section, the dielectric plug having a first dielectric constant, and the first hollow conductor section having a first hollow conductor cross-section configuration selected to only allow propagation in a single propagation mode through the first waveguide section for the frequency bandwidth; a second waveguide section arranged between the transceiver and the first waveguide section to receive the transmit signal from the transceiver and guide the transmit signal towards the first waveguide section, the second waveguide section comprising a second hollow conductor section enclosing a material having a second dielectric constant being lower than the first dielectric constant, wherein the second hollow conductor section has a second hollow conductor cross-section configuration being a scaled replica of the first hollow conductor cross-section configuration, selected to only allow propagation in the single propagation mode through the second waveguide section for the frequency bandwidth; a third waveguide section arranged between the antenna and the first waveguide section to receive the transmit signal from the first waveguide section and guide the transmit signal towards the antenna, the third waveguide section comprising a third hollow conductor section enclosing a material having a third dielectric constant being lower than the first dielectric constant, wherein the third hollow conductor section has a third hollow conductor cross-section configuration being a scaled replica of the first hollow conductor cross-section configuration, selected to only allow propagation in the single propagation mode through the third waveguide section for the frequency bandwidth; a first impedance matching waveguide section arranged between the first waveguide section and the second waveguide section, the first impedance matching waveguide section comprising a dielectric first impedance matching member in direct abutment with a first end of the dielectric plug comprised in the first waveguide section, the first impedance matching member having a fourth dielectric constant being lower than the first dielectric constant and higher than the second dielectric constant; and a second impedance matching waveguide section arranged between the first waveguide section and the third waveguide section, the second impedance matching waveguide section comprising a dielectric second impedance matching member in direct abutment with a second end of the dielectric plug comprised in the first waveguide section, the second impedance matching member having a fifth dielectric constant being lower than the first dielectric constant and higher than the third dielectric constant.

According to a third aspect of the present invention, it is provided a radar level gauge system for determining the filling level of a product in a tank, comprising: a transceiver for generating, transmitting and receiving electromagnetic signals having frequencies defining a frequency bandwidth; an antenna for radiating an electromagnetic transmit signal towards a surface of the product and for returning an electromagnetic reflection signal resulting from reflection of the electromagnetic transmit signal at the surface back towards the transceiver; a feed-through connecting the transceiver and the antenna; and processing circuitry coupled to the transceiver for determining the filling level based on a relation between the transmit signal and the reflection signal, wherein the feed-through comprises: a first waveguide section comprising a dielectric plug sealingly arranged in a first hollow conductor section, the dielectric plug having a first dielectric constant, and the first hollow conductor section having a first hollow conductor cross-section configuration selected to only allow propagation in a single propagation mode through the first waveguide section for the frequency bandwidth; a second waveguide section arranged between the transceiver and the first waveguide section to receive the transmit signal from the transceiver and guide the transmit signal towards the first waveguide section, the second waveguide section comprising a second hollow conductor section enclosing a material having a second dielectric constant being lower than the first dielectric constant, wherein the second hollow conductor section has a second hollow conductor cross-section configuration selected to only allow propagation in the single propagation mode through the second waveguide section for the frequency bandwidth; a third waveguide section arranged between the antenna and the first waveguide section to receive the transmit signal from the first waveguide section and guide the transmit signal towards the antenna, the third waveguide section comprising a third hollow conductor section enclosing a material having a third dielectric constant being lower than the first dielectric constant, wherein the third hollow conductor section has a third hollow conductor cross-section configuration selected to only allow propagation in the single propagation mode through the third waveguide section for the frequency bandwidth; a first impedance matching waveguide section arranged between the first waveguide section and the second waveguide section, the first impedance matching waveguide section comprising a dielectric first impedance matching member pressed against a first end of the dielectric plug comprised in the first waveguide section, the first impedance matching member having a fourth dielectric constant being lower than the first dielectric constant and higher than the second dielectric constant; and a second impedance matching waveguide section arranged between the first waveguide section and the third waveguide section, the second impedance matching waveguide section comprising a dielectric second impedance matching member pressed against a second end of the dielectric plug comprised in the first waveguide section, the second impedance matching member having a fifth dielectric constant being lower than the first dielectric constant and higher than the third dielectric constant.

According to a fourth aspect of the present invention, it is provided a radar level gauge system for determining the filling level of a product in a tank, comprising: a transceiver for generating, transmitting and receiving electromagnetic signals having frequencies defining a frequency bandwidth; an antenna for radiating an electromagnetic transmit signal towards a surface of the product and for returning an electromagnetic reflection signal resulting from reflection of the electromagnetic transmit signal at the surface back towards the transceiver; a feed-through connecting the transceiver and the antenna; and processing circuitry coupled to the transceiver for determining the filling level based on a relation between the transmit signal and the reflection signal, wherein the feed-through comprises: a first waveguide section comprising a dielectric plug sealingly arranged in a first hollow conductor section, the dielectric plug having a first dielectric constant, and the first hollow conductor section having a first hollow conductor cross-section configuration selected to only allow propagation in a single propagation mode through the first waveguide section for the frequency bandwidth; a second waveguide section arranged between the transceiver and the first waveguide section to receive the transmit signal from the transceiver and guide the transmit signal towards the first waveguide section, the second waveguide section comprising a second hollow conductor section enclosing a material having a second dielectric constant being lower than the first dielectric constant, wherein the second hollow conductor section has a second hollow conductor cross-section configuration selected to only allow propagation in the single propagation mode through the second waveguide section for the frequency bandwidth; a third waveguide section arranged between the antenna and the first waveguide section to receive the transmit signal from the first waveguide section and guide the transmit signal towards the antenna, the third waveguide section comprising a third hollow conductor section enclosing a material having a third dielectric constant being lower than the first dielectric constant, wherein the third hollow conductor section has a third hollow conductor cross-section configuration selected to only allow propagation in the single propagation mode through the third waveguide section for the frequency bandwidth; a first impedance matching waveguide section arranged between the first waveguide section and the second waveguide section, the first impedance matching waveguide section comprising a dielectric first impedance matching member in direct abutment with a first end of the dielectric plug comprised in the first waveguide section, the first impedance matching member having a fourth dielectric constant being lower than the first dielectric constant and higher than the second dielectric constant; and a second impedance matching waveguide section arranged between the first waveguide section and the third waveguide section, the second impedance matching waveguide section comprising a dielectric second impedance matching member in direct abutment with a second end of the dielectric plug comprised in the first waveguide section, the second impedance matching member having a fifth dielectric constant being lower than the first dielectric constant and higher than the third dielectric constant.

According to a fifth aspect of the present invention, it is provided a method of manufacturing a feed-through for a radar level gauge system, comprising the steps of: providing a composite waveguide section part including a first waveguide section comprising a dielectric plug having a first dielectric constant sealingly arranged in a first hollow conductor section, and a second waveguide section comprising a second hollow conductor section enclosing a material having a second dielectric constant being lower than the first dielectric constant, the first hollow conductor section and the second hollow conductor section being aligned to form a composite hollow conductor section; providing a third waveguide section part comprising a third hollow conductor section enclosing a material having a third dielectric constant being lower than the first dielectric constant; aligning the composite hollow conductor section and the third hollow conductor section; and welding the composite waveguide section part and the third waveguide section part together.

As was mentioned above, the welding in combination with the dielectric-metal seal in the first waveguide section part may provide zone separation through a so-called single seal. To provide for this, the welding steps may provide continuous welds that fulfil the requirements of an applicable standard, such as international standard IEC 60079-1 or similar standards.

According to various embodiments, the step of providing the composite waveguide section may comprise the steps of: providing a first waveguide section part comprising the dielectric plug sealingly arranged in the first hollow conductor section; providing a second waveguide section part comprising the second hollow conductor section; aligning the first hollow conductor section and the second hollow conductor section; and welding the first waveguide section part and the second waveguide section part together to form the composite waveguide section part having the composite hollow conductor section.

According to embodiments, the second waveguide section part may comprise a first recess for receiving the first waveguide section part; and the third waveguide section part may comprise a second recess for receiving the composite hollow conductor section part.

The first recess may be configured to align the cylinder axis of the first hollow conductor section with the cylinder axis of the second hollow conductor section, and the second recess may be configured to align the cylinder axis of the composite hollow conductor section with the cylinder axis of the third hollow conductor section.

According to various embodiments, the method may further comprise the steps of: arranging a first impedance matching waveguide section part between the first waveguide section part and the second waveguide section part before welding the first waveguide section part and the second waveguide section part together, the first impedance matching waveguide section part comprising a dielectric first impedance matching member having a fourth dielectric constant being lower than the first dielectric constant and higher than the second dielectric constant; and arranging a second impedance matching waveguide section part between the composite waveguide section part and the third waveguide section part before welding the composite waveguide section part and the third waveguide section part together, the second impedance matching waveguide section part comprising a dielectric second impedance matching member having a fifth dielectric constant being lower than the first dielectric constant and higher than the third dielectric constant.

It should be noted that the different parts may be provided simultaneously or in any order, so that the above steps need not necessarily be carried out in any particular order.

Further effects and variations of the present second aspect of the invention are largely similar to those described above with reference to the first aspect of the invention.

In summary, the present invention thus relates to a radar level gauge system, comprising a transceiver; an antenna; a feed-through connecting the transceiver and the antenna; and processing circuitry coupled to the transceiver. The feed-through comprises a first waveguide section comprising a glass plug sealingly arranged in a cylindrical first hollow conductor section having a diameter selected for single mode propagation; a second waveguide section arranged between the transceiver and the first waveguide section and comprising a cylindrical second hollow conductor section having a second diameter selected for single mode propagation, a third waveguide section arranged between the antenna and the first waveguide section comprising a cylindrical third hollow conductor section having a third diameter selected for single mode propagation; a first impedance matching waveguide section arranged between the first waveguide section and the second waveguide section, and a second impedance matching waveguide section arranged between the first waveguide section and the third waveguide section.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, various embodiments of the radar level gauge system according to the present invention are mainly discussed with reference to a battery-powered radar level gauge system with wireless communication capabilities.

It should be noted that this by no means limits the scope of the present invention, which equally well includes, for example, radar level gauge systems that are not included in a process management system or radar level gauge systems that are loop-powered or powered with dedicated power lines.

Figure 1:
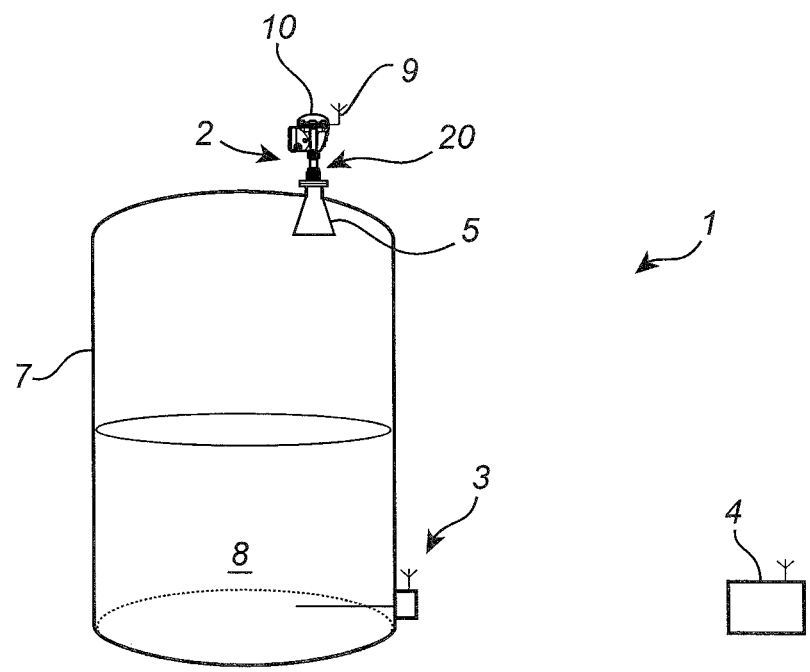
FIG. 1 schematically shows a process monitoring system comprising a radar level gauge system according to an example embodiment of the present invention.

FIG. 1 schematically shows a process monitoring system 1 comprising a plurality of field devices, including an example embodiment of a radar level gauge system 2 and a temperature sensing device 3 wirelessly connected to a host system 4. The radar level gauge system 2 comprises a measurement electronics unit 10 arranged outside the tank 7, an antenna 5 arranged inside the tank 7, and a feed-through 20 connecting the measurement electronics unit 10 with the antenna 5.

The radar level gauge system 2 and the temperature sensor 3 are both arranged on a tank containing a product 8 to be gauged.

To reduce the energy consumption of the radar level gauge system 2, at least parts of the radar level gauge system may be operated intermittently and energy may be stored during inactive or idle periods to be used during active periods.

Solutions for intermittent operation and energy storage are, for example, described in U.S. Pat. Nos. 7,952,514, 8,477,064 and 12/603,048, each of which is hereby incorporated by reference in its entirety.

Figure 2:
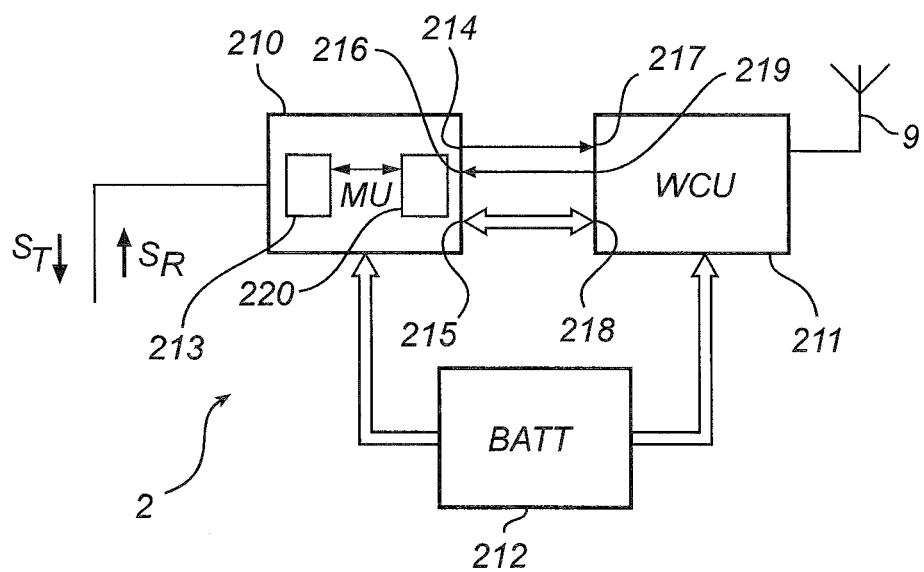
FIG. 2 is a block diagram schematically illustrating the radar level gauge system in FIG. 1.

With reference to FIG. 2, the radar level gauge system 2 in FIG. 1 comprises a measurement unit (MU) 210, a wireless communication unit (WCU) 211 and a local energy store in the form of a battery 212. The wireless communication unit 211 may advantageously be compliant with WirelessHART (IEC 62591). As is schematically indicated in FIG. 2, the MU 210 comprises a transceiver 213 and a measurement processor 220. The transceiver 213 is controllable by the measurement processor 220 for generating, transmitting and receiving electromagnetic signals having frequencies defining a frequency bandwidth, such as 24 GHz to 27 GHz. the measurement processor 220 is coupled to the transceiver 213 for determining the filling level in the tank 7 based on a relation between the transmit signal $S_T$ and the reflection signal $S_R$.

As is schematically indicated in FIG. 2, the measurement unit 210 comprises a first output 214, a second output 215, and a first input 216. The first output 214 is connected to a first input 217 of the wireless communication unit 211 through a first dedicated discreet line, the second output 215 is connected to a second input 218 of the wireless communication unit 211, and the first input 216 is connected to a first output 219 of the wireless communication unit 211 through a second dedicated discreet line. The second output 215 of the measurement unit 210 and the second input 218 of the wireless communication unit 211 may be configured to handle bidirectional data communication according to a serial or a parallel communication protocol to allow exchange of data between the measurement unit 210 and the wireless communication unit 211. The communication between the measurement unit 210 and the wireless communication unit 211 using the different inputs/outputs is described in more detail in U.S. patent application Ser. No. 13/537,513, which is hereby incorporated by reference in its entirety.

The above example of a wireless and locally powered configuration is intended to give the skilled person a detailed example of how various aspects and embodiments of the radar level gauge system according to the present invention can be implemented. It should, however, be noted that there are many other ways of powering and interfacing a radar level gauge system. Such other ways are widely accessible to one of ordinary skill in the art and can be implemented without excessive experimentation or undue burden.

Figure 3:
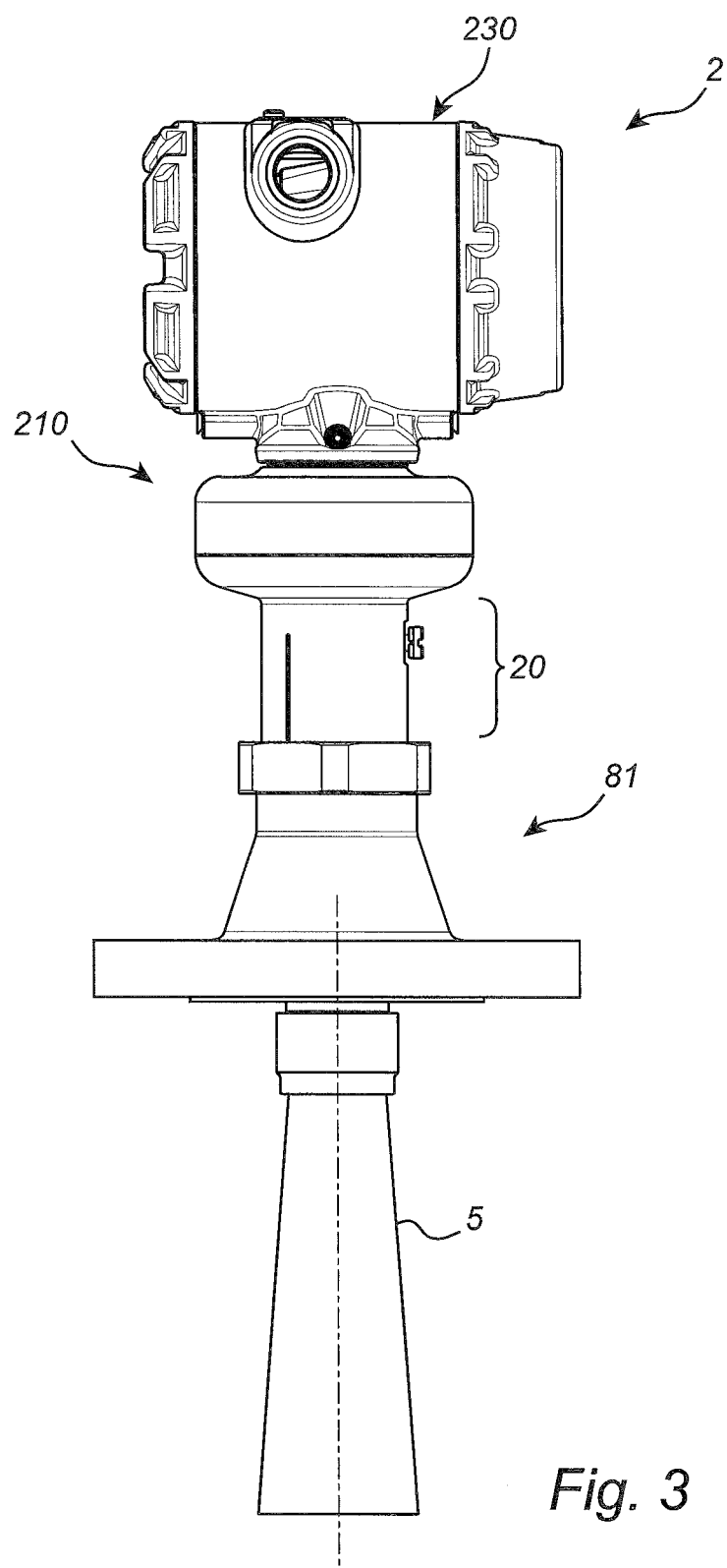
FIG. 3 is a schematic side view of the radar level gauge system in FIG. 1.

FIG. 3 is a side-view of the radar level gauge system 2 in FIG. 1. Referring to FIG. 3, the radar level gauge system 2 comprises measurement unit 210, communication unit 230, process connection 81, and antenna 5. Referring to the description provided above in relation to FIG. 1 and FIG. 2, the measurement unit 210 comprises the transceiver 213, the measurement processor 220, and the feed-through 20; and the communication unit 230 comprises the wireless communication unit 211 and the battery 212.

As will be described in more detail further below, the feed-through 20 forms part of an explosion-proof enclosure, and the process connection provides a sealing connection to the interior of the tank 7. This allows removal and replacement of the measurement unit 210 without being exposed to the interior of the tank 7.

In the following, the measurement unit 210 will be described with reference to the cross-section view of the measurement unit 210 in FIG. 4a, and the enlarged views in FIG. 4b and FIG. 4c.

Figure 4A:
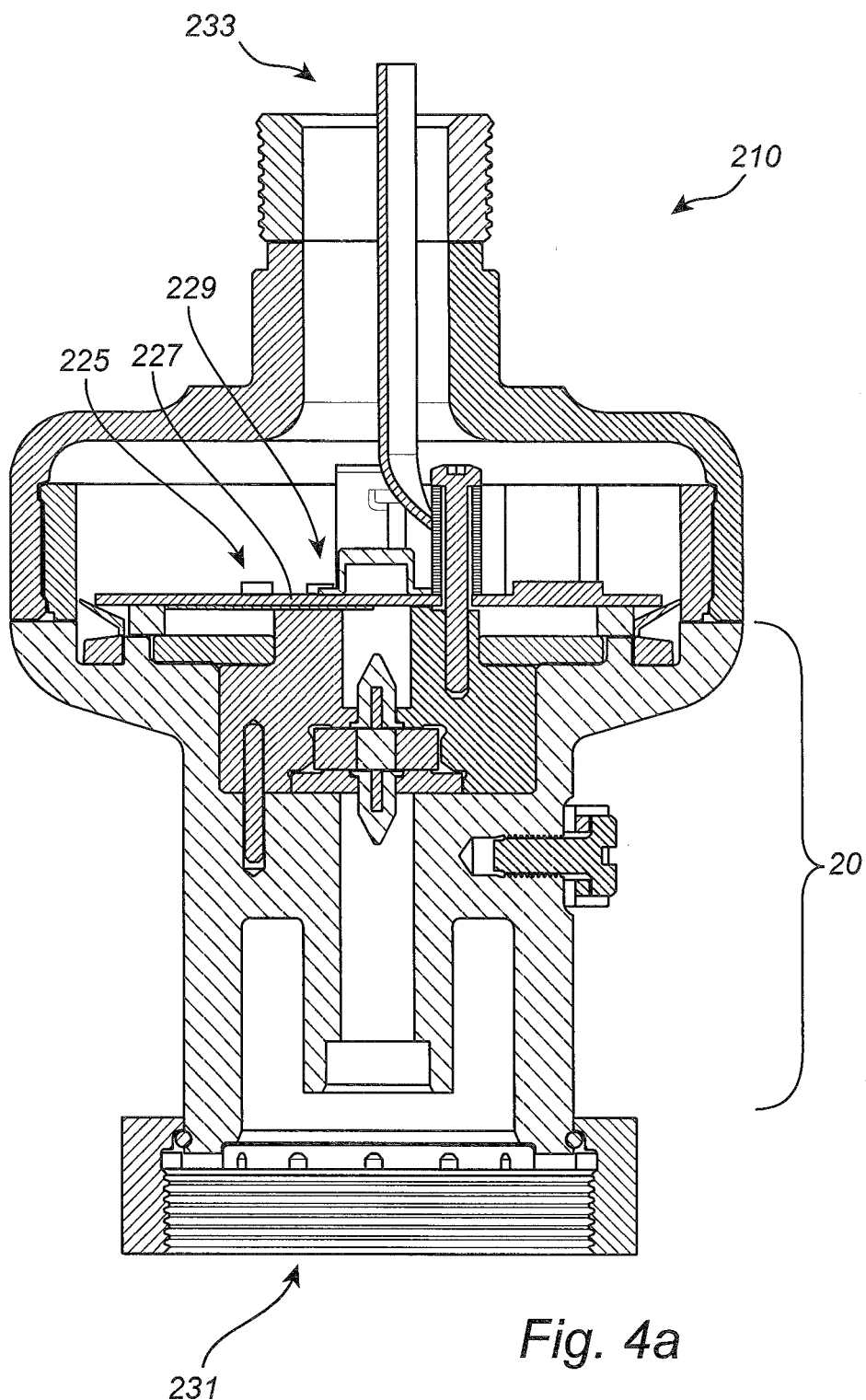
FIG. 4a-c schematically illustrate the feed-through and the signal feeder configuration of the radar level gauge system in FIG. 3.

Referring first to FIG. 4a, the measurement unit 210, the transceiver 213 and the measurement processor 220 are schematically collectively indicated by circuits 225 on a circuit board 227, and a feeder arrangement 229 for providing the transmit signal to the antenna (not shown in FIG. 4) via the feed-through 20. As is also indicted in FIG. 4a, the measurement unit 210 comprises a process connection interface 231 and a communication unit interface 233.

The process connection interface 231 is configured for mechanical and electrical connection of the feed-through 20 of the measurement unit 210 to the process connection 81. The communication unit interface 233 is configured for mechanical and electrical connection of the measurement unit 210 to the communication unit 230.

Figure 4B:
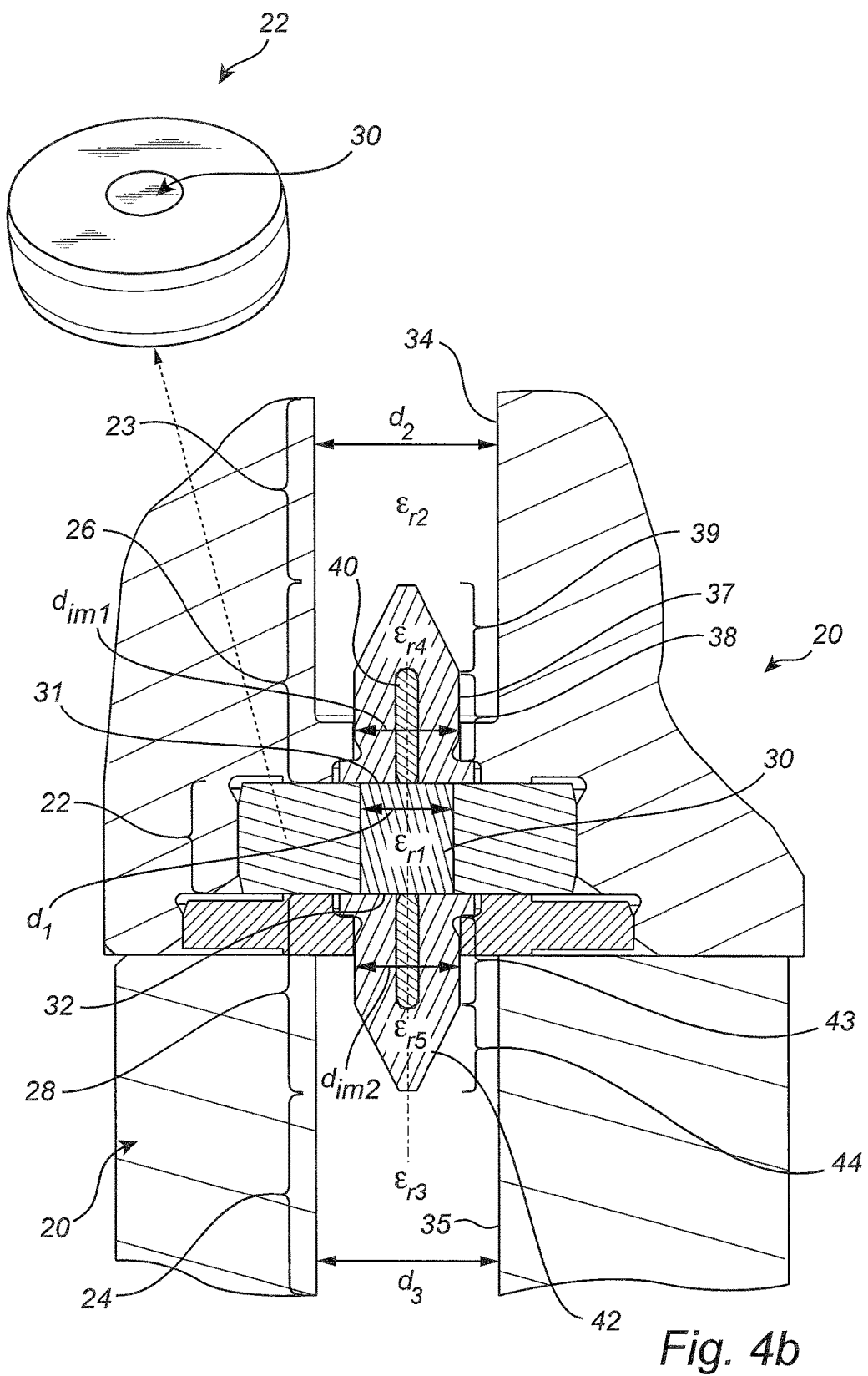

FIG. 4b is an enlarged cross-section view of a portion of the feed-through 20 comprised in the radar level gauge system 2, and includes a perspective view of the first waveguide section part 22 comprised in the feed-through 20. Referring mainly to FIG. 4b, the feed-through 20 comprises a first waveguide section 22, a second waveguide section 23, a third waveguide section 24, a first impedance matching waveguide section 26, and a second impedance matching waveguide section 28. As is schematically indicated in FIG. 4b, the second waveguide section 22 is arranged between the feeder arrangement 229 (see also FIG. 4a) comprised in the measurement unit 210 and the first waveguide section 22, the third waveguide section 24 is arranged between the first waveguide section 22 and the process connection interface 231 (see also FIG. 4a), the first impedance matching waveguide section 26 is arranged between the first waveguide section 22 and the second waveguide section 23, and the second impedance matching waveguide section 28 is arranged between the first waveguide section 22 and the third waveguide section 24.

The first waveguide section 22 (shown in greater detail in the enlarged perspective view in FIG. 4b) comprises a dielectric plug, here a glass plug 30, having a first relative dielectric constant $\varepsilon_{r1}$, sealingly arranged in a first hollow waveguide section, having a first hollow conductor diameter $d_1$ selected to only allow propagation through the first waveguide section in a single propagation mode, such as the $TE_{11}$ mode. The glass plug 30 may advantageously be fused into a cylindrical hole in a metal disc. The metal disc with fused glass may then be machined to achieve planar smooth end surfaces so that the length of the glass plug 30 is identical to the length of the first hollow waveguide section defined by the first waveguide section part 22. Accordingly, the glass plug 30 has a planar first end 31 and a planar second end 32.

The second waveguide section 23 comprises a second hollow conductor section 34 with a second hollow conductor diameter $d_2$ selected to only allow propagation through the second waveguide section in the single propagation mode ($TE_{11}$). The second waveguide section encloses a dielectric material having a second relative dielectric constant $\varepsilon_{r2}$.

The third waveguide section 24 comprises a third hollow conductor section 35 with a third hollow conductor diameter $d_3$ selected to only allow propagation through the third waveguide section in the single propagation mode ($TE_{11}$). The third waveguide section encloses a dielectric material having a third relative dielectric constant $\varepsilon_{r3}$.

The first impedance matching waveguide section 26 comprises a dielectric first impedance matching member 37 with a cylindrical portion 38 having a first impedance matching member diameter $d_{im1}$, and a frusto-conical portion 39 facing away from the glass plug 30 of the first waveguide section 22. The first impedance matching member 37 has a fourth relative dielectric constant $\varepsilon_{r4}$. In the example embodiment schematically illustrated by FIG. 3a-c, the first impedance matching member 37 further comprises a metal pin 40 embedded in the dielectric material.

The second impedance matching waveguide section 28 comprises a dielectric second impedance matching member 42 with a cylindrical portion 43 having a second impedance matching member diameter $d_{im2}$, and a frusto-conical portion 44 facing away from the glass plug 30 of the first waveguide section 22. The second impedance matching member 42 has a fifth relative dielectric constant $\varepsilon_{r5}$. In the example embodiment schematically illustrated by FIG. 3a-c, the second impedance matching member 42 further comprises a metal pin 45 embedded in the dielectric material.

In an example embodiment, the second waveguide section 23 and the third waveguide section 24 may both use air as the dielectric. In this case, and for a frequency bandwidth of about 24 GHz to about 27 GHz, the second hollow conductor diameter $d_2$ and the third hollow conductor diameter $d_3$ may both be about 8.1 mm. Using a suitable glass plug with the type of glass selected to provide a relative dielectric constant $\varepsilon_{r1}$ of about 3.9, the first hollow conductor diameter $d_1$ may be about 4.1 mm.

With this selection of relative dielectric constant and diameter of the glass plug 30, single mode propagation across the frequency bandwidth can be achieved in the first 22, second 23 and third 24 waveguide sections. Through the provision and suitable configuration of the first 26 and second 28 impedance matching waveguide sections, signal loss due to unwanted reflections inside the feed-through can be reduced considerably.

Figure 4C:
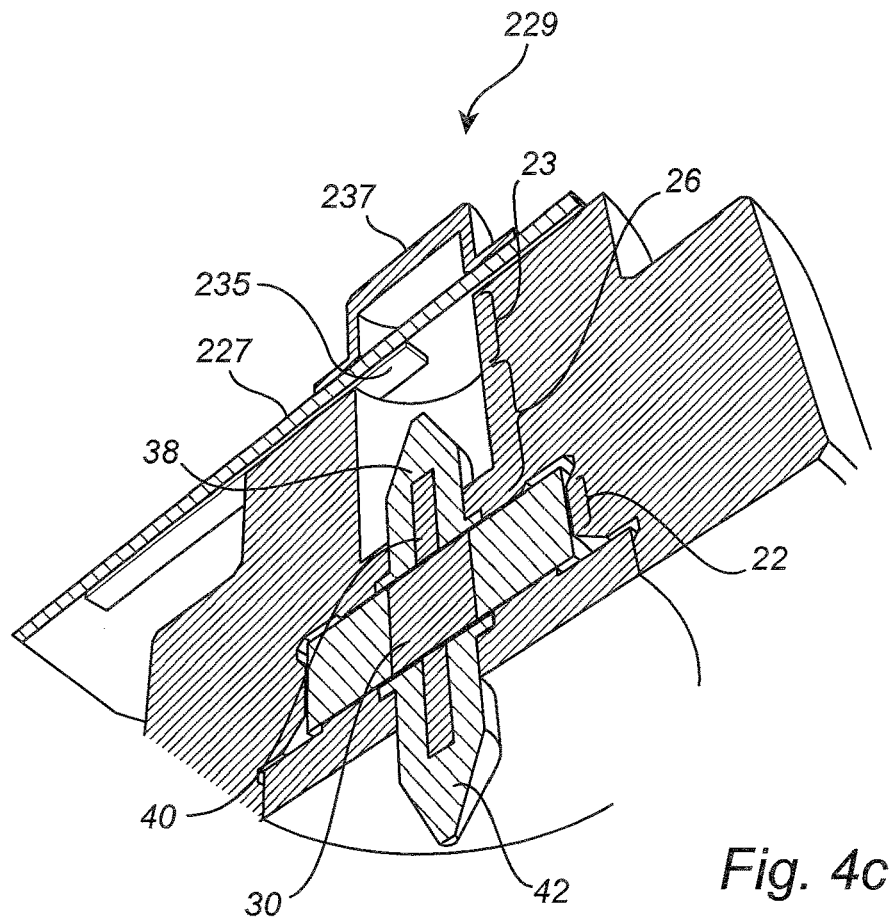

In the example embodiment of FIG. 4a-c, the feed-through 20 is substantially electrically symmetrical such that the configurations and arrangements of the first 37 and the second 42 impedance matching members are substantially identical. Therefore, only the detailed configuration and arrangement of the first impedance matching member 27 will be described below.

As is schematically shown in FIG. 4b, the first impedance matching member 37 is pressed against the glass plug 30 of the first waveguide member 22 to ensure that there is no gap between the glass plug 30 and the first impedance matching member 37. Simulations have shown that even a water layer as thin as 0.05 mm between the glass plug 30 and the impedance matching member would result in significant loss of signal.

Further, the fourth dielectric constant $\varepsilon_{r4}$ of the first impedance matching member 27 is lower than the first dielectric constant $\varepsilon_{r1}$ of the glass plug 30 and higher than the second dielectric constant $\varepsilon_{r2}$ of the dielectric material in the second waveguide section 23. A suitable dielectric material for the first impedance matching member 27 may be PEEK, which has a dielectric constant $\varepsilon_{r4}$ of about 3.2.

The intermediate step in dielectric constant, as such, provides for a reduced loss of signal in the feed-through, to provide for an even smoother impedance transition in the feed-through, the first impedance transition member 37 is, as was also mentioned further above, provided with a portion 39 exhibiting a decreasing radial extension with increasing distance from the glass plug 30.

To inhibit the formation of the next propagation mode ($TM_{01}$) in the first impedance matching waveguide section 26, the first impedance matching member 37 comprises, as was also mentioned further above, a mode filter in the form of a metal pin 40 arranged along the cylinder axis of the waveguide section.

The feeder arrangement 229 for relaying the microwave signals (transmit signal $S_T$ and reflection signal $S_R$) between the transceiver 213 and the feed-through 20 will now be described with reference to FIG. 4c. Referring to FIG. 4c, the feeding arrangement 229 comprises a probe feeder 235 on the microwave circuit board 227, and a cylindrical conductive "cap" 237 with a length substantially corresponding to a quarter wavelength at the center frequency of the transmit signal $S_T$ opposite the second waveguide section 23. The probe feeder 235 and the cap 237 together act as a quarter-wave antenna to allow passage of microwaves between the transceiver 213 and the second waveguide section 23 of the feed-through with low signal loss due to signal reflection.

Figure 5A:
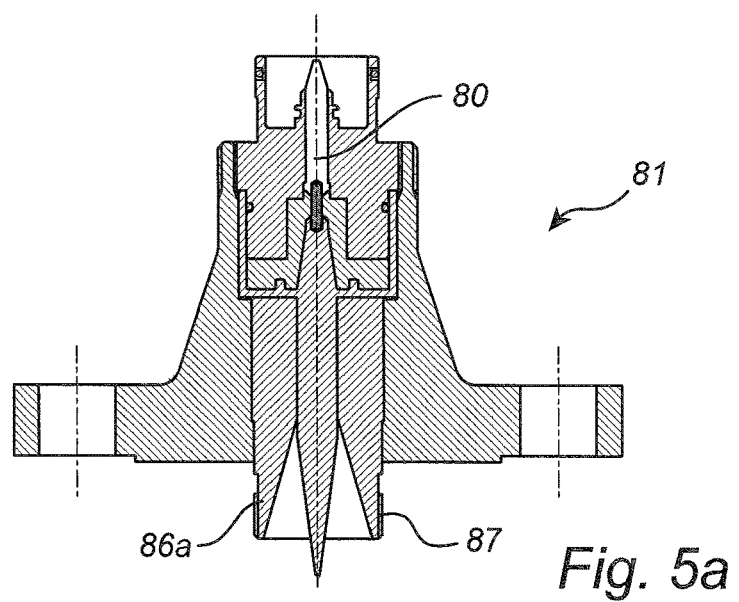
FIG. 5a-b schematically illustrate the process connection of the radar level gauge system in FIG. 3.
Figure 5B:
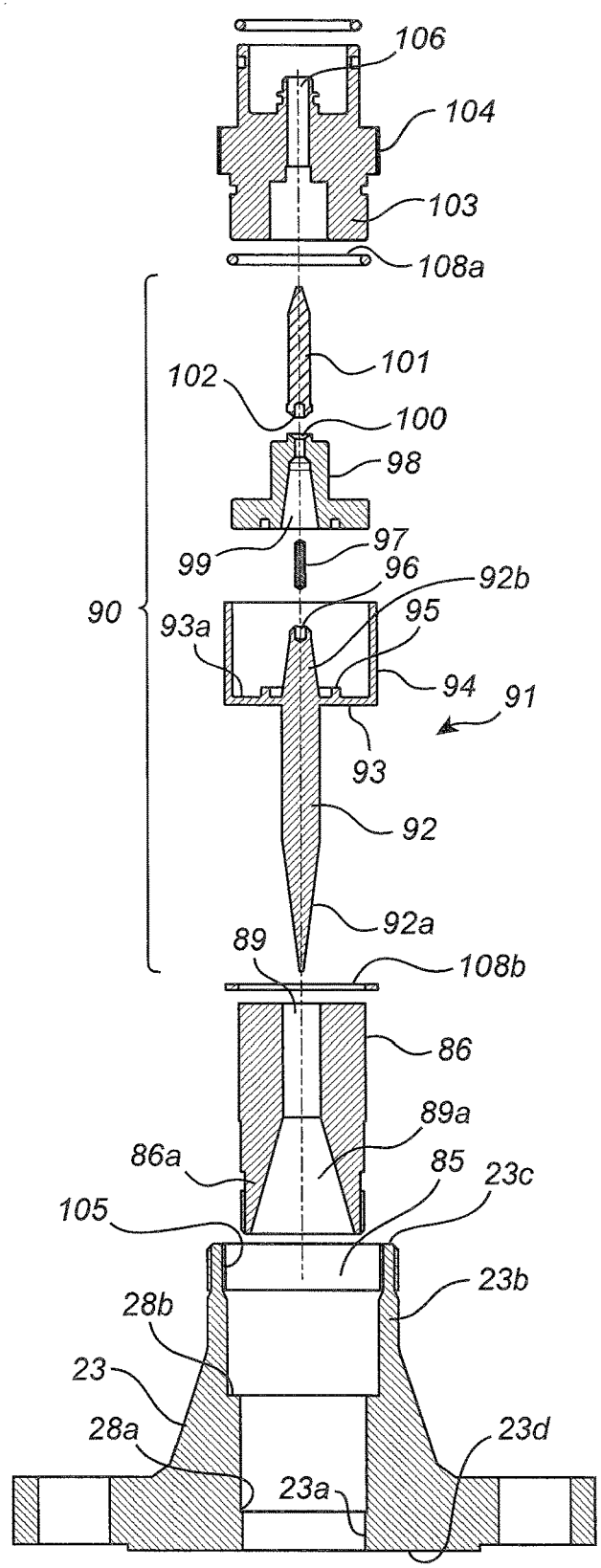

Referring to FIG. 5a-b, the process connection 81 is designed for an operating frequency of around 26 GHz. In the illustrated case, with a filling member of PTFE, the hollow wave guide 80 has a diameter in the order of 5-6 mm.

With reference primarily to FIG. 5b, the process connection 81 comprises a fixed tank connection 23. In the opening 85 is fitted an essentially cylindrical tank connection adaptor 86. The adaptor 86 is suspended by the tank connection 23, but in this case only by the lower abutment 28a of the tank connection 23.

In the illustrated case, the adaptor 86 is suspended in a lower (interior facing) portion 23a of the fixed tank connection, so that an upper (exterior facing) portion 23b of the tank connection 23 extends above the adaptor 86. The adaptor 86 may alternatively be flush with the upper surface 23c of the tank connection structure, or even extend above the surface 23c. Further, in the illustrated example, the lower (interior facing) portion 86a of the adaptor 86 extends beyond the bottom surface 23d of the tank connection 23. A threading 87 is here formed on the peripheral surface of the lower portion 86a, and the antenna horn 82 has a corresponding threading 88 to enable easy mounting of the antenna horn 82 to the tank connection adaptor 81.

The adaptor 86 has a channel 89 which forms a lower portion of the wave guide 80. The bottom portion 89a of the channel is outwardly tapered, i.e. becomes wider closer to the interior of the tank, to provide matching with the antenna horn 82. In the channel 89 there is arranged a coupling arrangement 90, here comprising a dielectric wave guide filling element 91, typically made of a relatively soft dielectric material, such as PTFE. The member 91 has a first elongated center portion 92, a second disc-shaped portion 93 extending out from the center portion, and a third cylindrical portion 94 extending upwards from the periphery of the disc-shaped portion. The second and third portions thereby create the shape of a bucket. On the upper surface 93a of the disc-shaped portion 93 there is further formed an annular protrusion 95, intended to act as a quarter wave choke. The center portion 92 has a tapered lower end 92a which extends into the tapered portion 89a of the channel 89. The upper end 92b of the center portion 92 is also slightly tapered, and has in its end an indentation 96 in which is fitted a pin 97 of a structurally strong dielectric material, such as resin, glass or aluminum oxide.

The pin 97 is held in place by an intermediate metal element 98, adapted to fit in the interior of the bucket, and having an inner space 99 formed to receive the upper end 92b of the center portion 92. The metal element 98 has an opening 100 through which the pin 97 extends. A second wave guide dielectric filling element 101 is arranged on the metal element 98, and has in its lower end an indentation 102 adapted to receive the pin.

The pin 97 held in place by the metal element 98 serves to prevent that a relatively soft dielectric wave guide filling element is forced out of the channel 89 by the pressure inside the tank, in particular during conditions of elevated temperatures. With this design, a process connection 81 designed for 26 GHz with a wave guide filling of PTFE can withstand pressures of up to 40 bar in temperatures of up to 200 degrees Celsius.

The process connection 81 further comprises a metal fastening member 103, arranged to be secured to the tank connection 23 such that the coupling arrangement 90 comprising the wave guide filling elements 91 and 101, as well as the pin 97 and metal element 98, is sandwiched between the tank connection 23 and the fastening member 103. In the illustrated case, the fastening member 103 has an outer threading 104, corresponding to a threading 105 on the inside of the upper portion 23b of the tank connection 23, so that the fastening member 103 can be securely threaded in place. The fastening member 103 further has a channel 106, adapted to surround the second wave guide filling element 101, to form the upper part of the wave guide 80.

The process connection 81 may also include a process seal, i.e. a seal preventing tank atmosphere potentially including product in gas form from leaving the tank. This may, for example, be accomplished by a plurality of sealing elements included in the coupling arrangement. In this embodiment, sealing elements are not arranged around the filling member 91, as the embodiment in FIG. 5a-b is intended for elevated temperatures. Under these conditions, potential variations in diameter of the PTFE filling member make sealing difficult. For this purpose, the filling member has the bucket shape described above, and a sealing element such as an o-ring 108a is provided between the inside of the cylindrical portion 94 and the fastening member 103. The material thickness of the portion 94 is much smaller, thus leading to smaller potential heat expansion. A further sealing element, here a flat ring 108b is provided between the upper annular abutment 28b of tank connection 23 and the peripheral part of the disc shaped portion 93.

To ensure that possible over-pressure inside the tank does not damage the feed-through 20, the upper portion 23b of the tank connection 23 comprises holes (not shown) that are fluid flow connecting the opening 85 with the outside of the tank connection 23. If the sealing elements 108a, 108b should fail, these holes will then provide a safety escape path for gas, preventing a sudden pressure increase acting on the different components of the feed-through 20.

Figure 6:
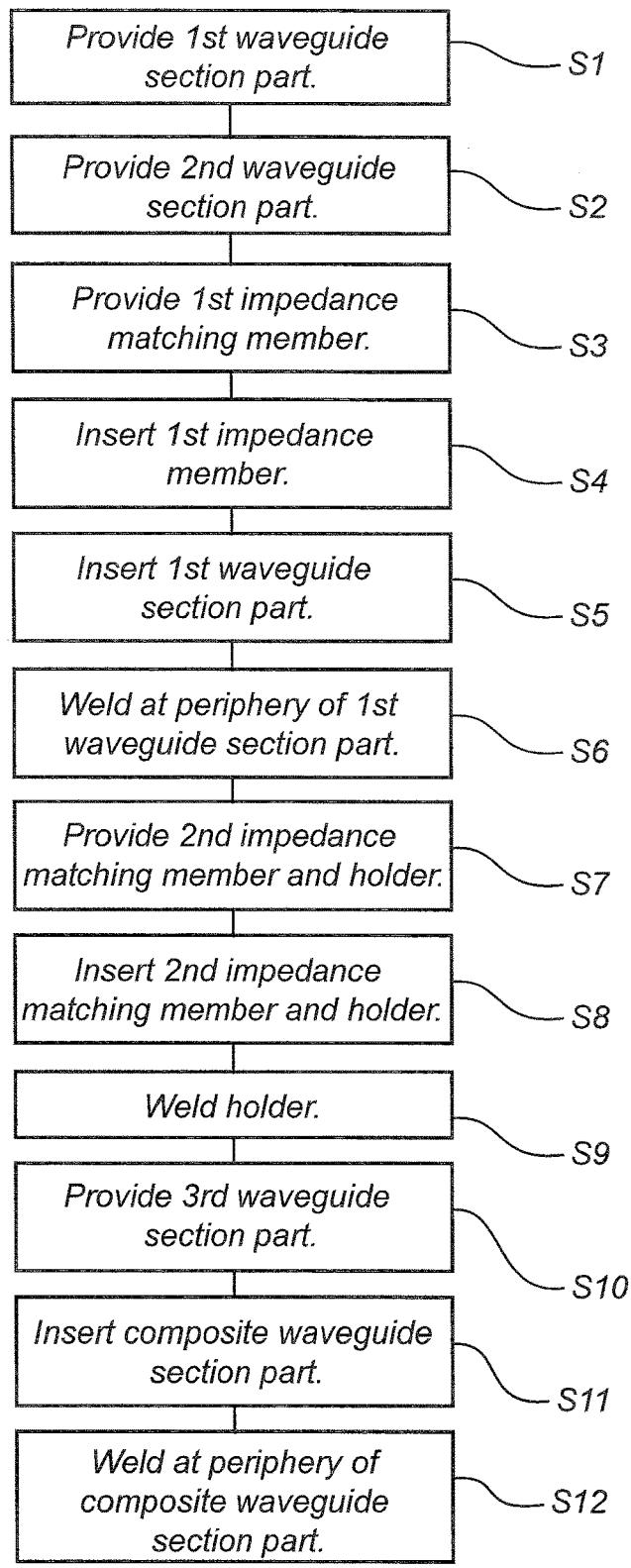
FIG. 6 is a block diagram schematically illustrating a manufacturing method according to an embodiment of the present invention.

An embodiment of the method according to the invention of manufacturing the feed-through will be described below with reference to the flow-chart in FIG. 6 and the schematic illustrations in FIG. 7a-f.

In a first step S1, a first waveguide section part 22 comprising a glass plug 30, having a first relative dielectric constant $\varepsilon_{r1}$, sealingly arranged in a first hollow conductor section of the first waveguide section part 22 is provided.

In a second step S2, a second waveguide section part 50 is provided. Referring to FIG. 5a, the second waveguide section part 50 comprises a second hollow conductor section 23 enclosing a material (such as air) having a second relative dielectric constant $\varepsilon_{r2}$ being lower than the first relative dielectric constant $\varepsilon_{r1}$.

In a third step, S3, a dielectric first impedance matching member 37 is provided. The first impedance matching member 37 comprises a dielectric material having a relative dielectric constant $\varepsilon_{r4}$ being lower than the first relative dielectric constant $\varepsilon_{r1}$ and higher than the second relative dielectric constant $\varepsilon_{r2}$.

Figures 7A, 7B:
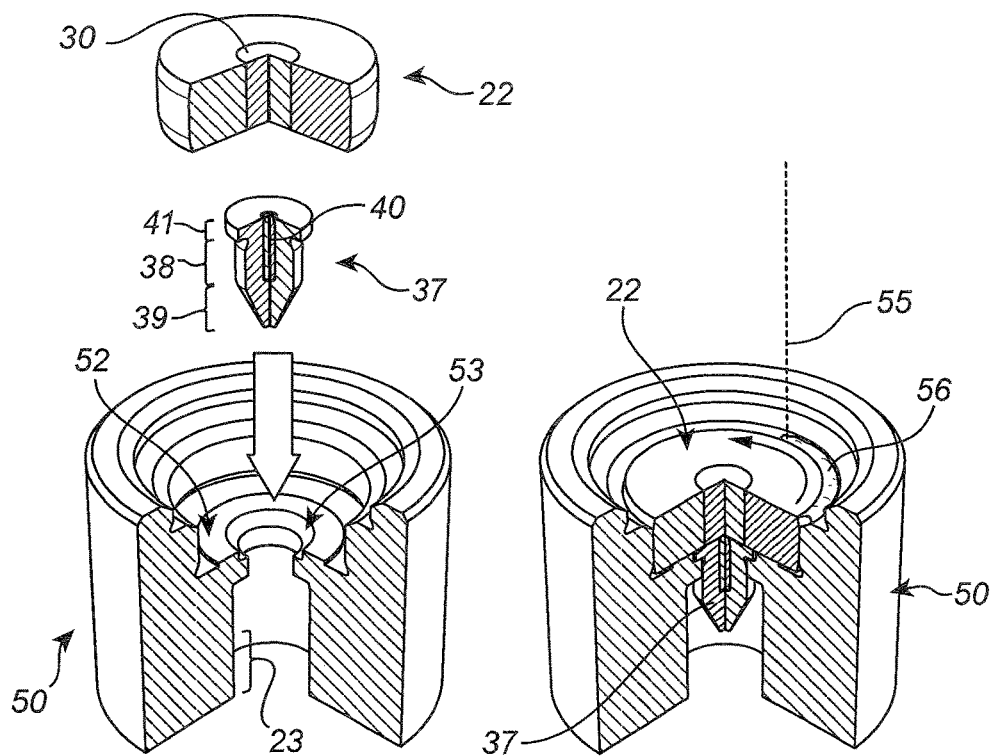
FIG. 7a-f are schematic illustrations of the method according to FIG. 6.

Referring to FIG. 7a, the first impedance matching member 37 has a cylindrical portion 38, a frusto-conical portion 39 and a shoulder portion 41 having a larger diameter than the cylindrical portion 38. There is also a metal pin 40 embedded in the first impedance matching member 37. With continued reference to FIG. 7a, the second waveguide section part 50 comprises a first recess 52 dimensioned to receive the first waveguide section part 22, and a second recess 53, inside the first recess 52, dimensioned to receive the first impedance matching member 37 in such a way that the shoulder portion 41 of the first impedance matching member 37 can rest on the second recess 53.

In the subsequent step S4, the first impedance matching member 37 is inserted in the second waveguide section part 50 so that the shoulder portion 41 rests on the second recess 53. The first impedance matching member 37 is thereby aligned with the second waveguide section 23.

Thereafter, in step S5, the first waveguide section part 22 is inserted in the first recess of the second waveguide section part 50, on top of the first impedance matching member 37. The first recess 52 of the second waveguide section part 50 is configured to align the cylinder axis of the first hollow waveguide section of the first waveguide section part 22 with the cylinder axis of the second hollow waveguide section of the second waveguide section part 50 and the axis of the first impedance matching member 37. To reduce the risk of a thin gap forming between the glass plug 30 and the first impedance matching member 37, the first 52 and second 53 recesses may be dimensioned and tolerances to ensure direct contact between the glass plug 30 and the first impedance matching member 37 when the first waveguide section part 22 is inserted in the second waveguide section part 50.

After insertion of the first impedance matching member 37 and the first waveguide section part 22 in the second waveguide section part 50, the first waveguide section part 22 and the second waveguide section part 50 are welded together along their peripheral interface in step S6. This is schematically indicated in FIG. 7b by laser beam 55. The glass-metal interface in the first waveguide section part 22 and the weld 56 at the periphery of the first waveguide section part 22 form part of a gas tight seal of the feed-through 20 being manufactured.

In a subsequent step S7, a second impedance matching member 42 and a holder 58 for the second impedance matching member 42 are provided.

Figure 7C:
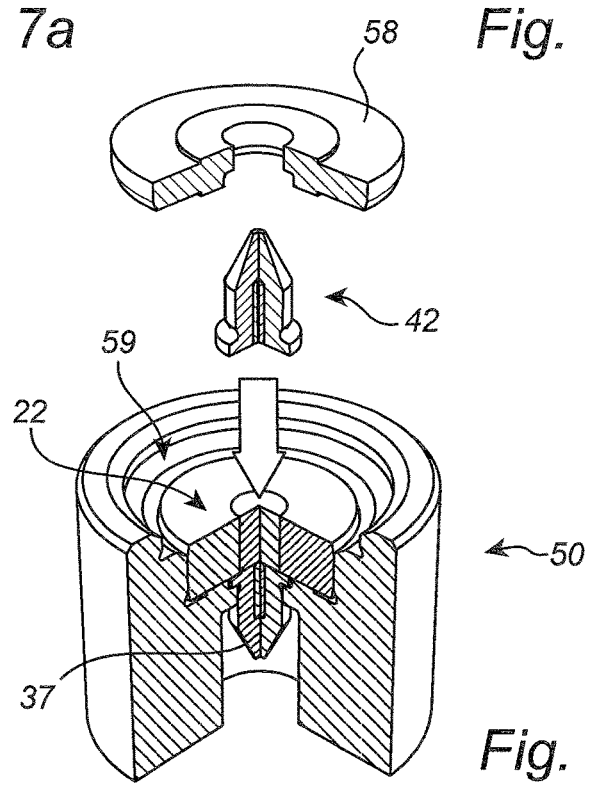
Figure 7D:
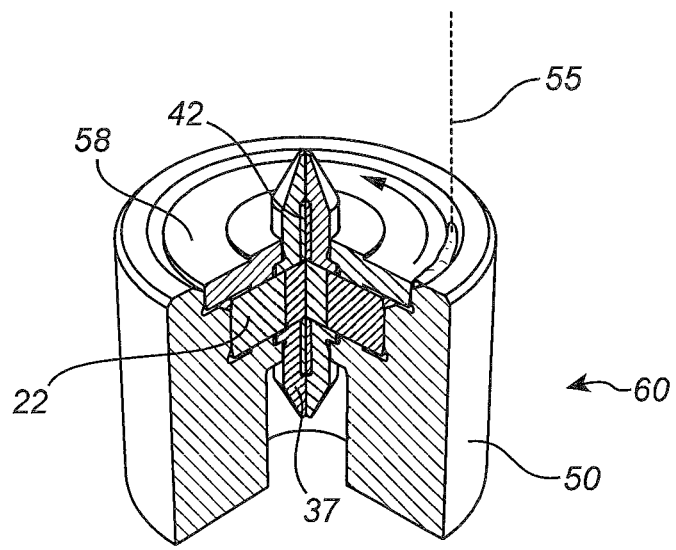

As is schematically shown in FIG. 7c, the second impedance matching member 42 and the holder 58 are thereafter, in step S8, inserted in a third recess 59 of the second waveguide section part 50, dimensioned to receive the holder 58 and to align the second impedance matching member 42 to the already existing waveguiding portions of the feed-through.

In the next step S9, the holder 58 and the second waveguide section part 50 are welded together along their peripheral interface to keep the second impedance matching member 42 in place and to prevent the formation of a gap between the glass plug 30 and the second impedance matching member 42. After this welding step S9, a composite waveguide section part 60 has been formed.

Figure 7E:
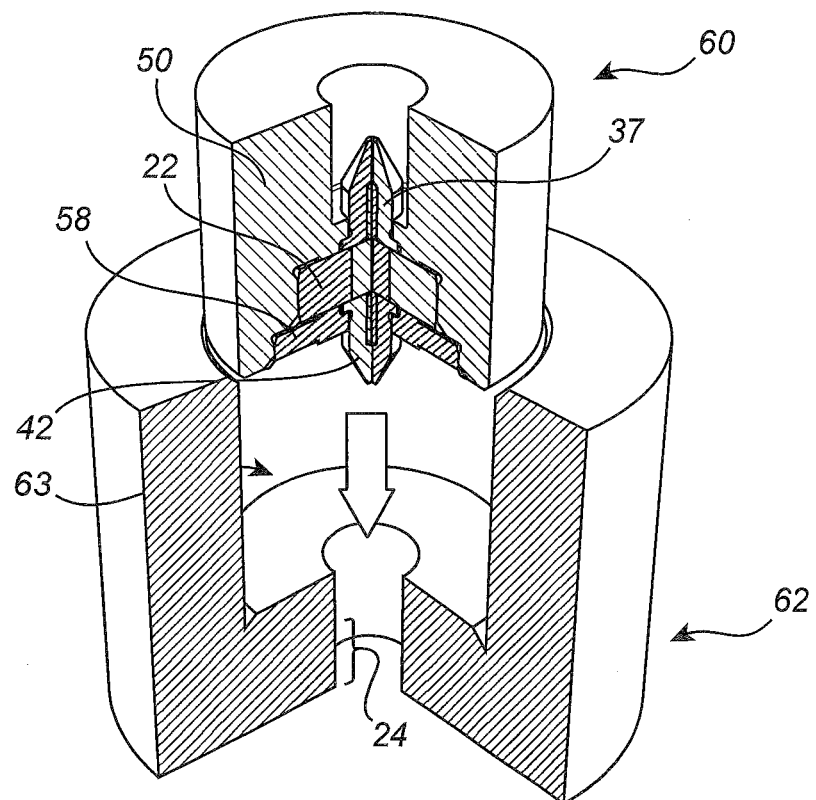

A third waveguide section part 62 is provided in step S10. Referring to FIG. 7e, the third waveguide section part 62 comprises a third hollow conductor section 24 enclosing a material (such as air) having a third relative dielectric constant $\varepsilon_{r3}$ being lower than the first relative dielectric constant $\varepsilon_{r1}$. The third waveguide section part 62 also comprises a recess 63 for receiving the composite waveguide section part 60.

In the next step S11, the composite waveguide section part 60 is turned over and inserted in the recess 63 of the third waveguide as is schematically indicated in FIG. 7e.

Figure 7F:
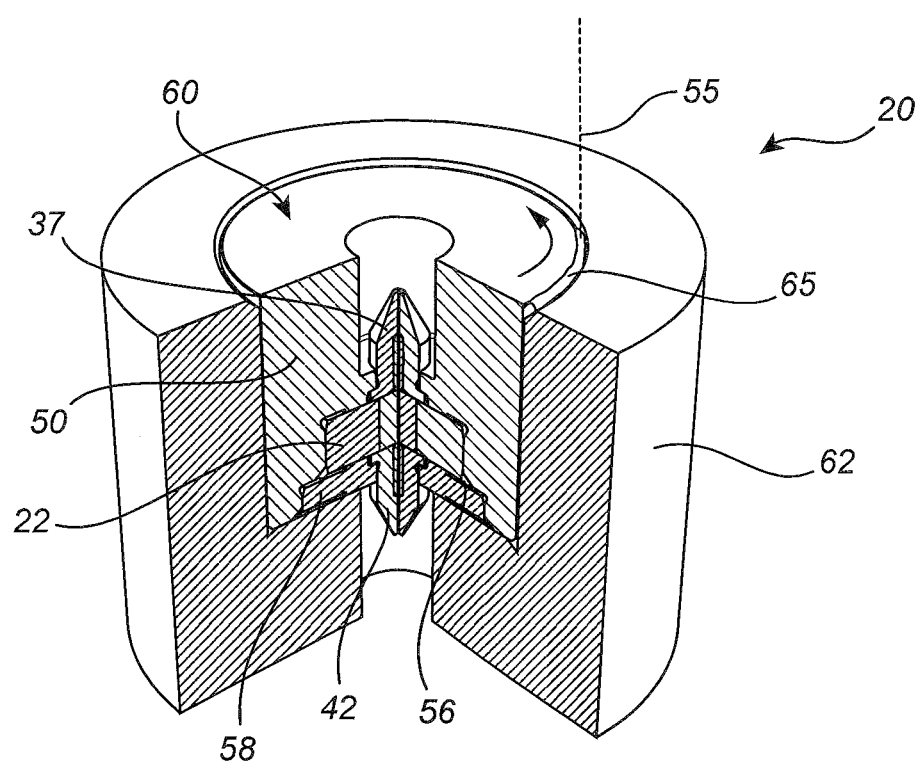

After insertion of the composite waveguide section part 60 in the third waveguide section part 62, the composite waveguide section part 60 and the third waveguide section part 62 are welded together along their peripheral interface in the final step S12 to form weld 65. This is schematically indicated in FIG. 7f by laser beam 55. The glass-metal interface in the first waveguide section part 22, the weld 56 at the periphery of the first waveguide section part 22, and the weld 65 at the periphery of the composite waveguide section part together form a gas tight seal, so that the feed-through 20 is a so-called single seal feed-through.

The person skilled in the art realizes that the present invention by no means is limited to the preferred embodiments described above. On the contrary, many modifications and variations are possible within the scope of the appended claims.

What is claimed is:

1. A radar level gauge system for determining the filling level of a product in a tank, comprising:
    a transceiver for generating, transmitting and receiving electromagnetic signals having frequencies defining a frequency band having a frequency bandwidth;
    an antenna for radiating an electromagnetic transmit signal towards a surface of the product and for returning an electromagnetic reflection signal resulting from reflection of the electromagnetic transmit signal at the surface back towards said transceiver;
a feed-through connecting said transceiver and said antenna; and
processing circuitry coupled to said transceiver for determining said filling level based on a relation between said transmit signal and said reflection signal,
wherein said feed-through comprises:
a first waveguide section comprising a dielectric plug sealingly arranged in a cylindrical first hollow conductor section, said dielectric plug having a first dielectric constant, and said first hollow conductor section having a first hollow conductor diameter selected to only allow propagation in a single propagation mode through said first waveguide section for said frequency band;
a second waveguide section arranged between said transceiver and said first waveguide section to receive said transmit signal from said transceiver and guide said transmit signal towards said first waveguide section, said second waveguide section comprising a cylindrical second hollow conductor section enclosing a material having a second dielectric constant being lower than said first dielectric constant, wherein said second hollow conductor section has a second hollow conductor diameter, greater than said first hollow conductor diameter, selected to only allow propagation in said single propagation mode through said second waveguide section for said frequency band;
a third waveguide section arranged between said antenna and said first waveguide section to receive said transmit signal from said first waveguide section and guide said transmit signal towards said antenna, said third waveguide section comprising a cylindrical third hollow conductor section enclosing a material having a third dielectric constant being lower than said first dielectric constant, wherein said third hollow conductor section has a third hollow conductor diameter, greater than said first hollow conductor diameter, selected to only allow propagation in said single propagation mode through said third waveguide section for said frequency band;
a first impedance matching waveguide section arranged between said first waveguide section and said second waveguide section, said first impedance matching waveguide section comprising a dielectric first impedance matching member in direct abutment with a first end of the dielectric plug comprised in said first waveguide section, said first impedance matching member having a fourth dielectric constant being lower than said first dielectric constant and higher than said second dielectric constant; and
a second impedance matching waveguide section arranged between said first waveguide section and said third waveguide section, said second impedance matching waveguide section comprising a dielectric second impedance matching member in direct abutment with a second end of the dielectric plug comprised in said first waveguide section, said second impedance matching member having a fifth dielectric constant being lower than said first dielectric constant and higher than said third dielectric constant.

2. The radar level gauge system according to claim 1, wherein:
said first impedance matching waveguide section comprises a cylindrical fourth hollow conductor section with a fourth hollow conductor diameter; and
said second impedance matching waveguide section comprises a cylindrical fifth hollow conductor section with a fifth hollow conductor diameter,
said fourth hollow conductor diameter being greater than said first hollow conductor diameter and smaller than said second hollow conductor diameter; and
said fifth hollow conductor diameter being greater than said first hollow conductor diameter and smaller than said third hollow conductor diameter.

3. The radar level gauge system according to claim 1, wherein:
said first impedance matching member comprises a cylindrical portion having a first impedance matching member diameter greater than said first hollow conductor diameter and smaller than said second hollow conductor diameter; and
said second impedance matching member comprises a cylindrical portion having a second impedance matching member diameter greater than said first hollow conductor diameter and smaller than said third hollow conductor diameter.

4. The radar level gauge system according to claim 1, wherein:
said first impedance matching member comprises a portion exhibiting a decreasing diameter with increasing distance from the first end of said dielectric plug; and
said second impedance matching member comprises a portion exhibiting a decreasing diameter with increasing distance from the second end of said dielectric plug.

5. The radar level gauge system according to claim 1, wherein at least one of said first and second impedance matching waveguide sections comprises a mode filter for suppressing propagation in other modes than said single propagation mode.

6. The radar level gauge system according to claim 5, wherein said mode filter comprises a metal pin embedded in at least one of said first impedance matching member and said second impedance matching member.

7. The radar level gauge system according to claim 1, wherein said first impedance matching member comprises a first polymer material, and said second impedance matching member comprises a second polymer material.

8. The radar level gauge system according to claim 1, wherein:
said first impedance matching member is pressed against the first end of said dielectric plug; and
said second impedance matching member is pressed against the second end of said dielectric plug.

9. The radar level gauge system according to claim 1, wherein a length of said dielectric plug is identical to a length of said first hollow conductor section.

10. The radar level gauge system according to claim 1, wherein said dielectric plug is sealingly arranged in said first hollow conductor section in such a way that a physical or chemical bond is formed between said dielectric plug and said first hollow conductor.

11. The radar level gauge system according to claim 10, wherein said physical or chemical bond extends at least three millimeters along an axial direction of said first waveguide section.

12. The radar level gauge system according to claim 11, wherein said physical or chemical bond extends less than 10 millimeters along the axial direction of said first waveguide section.

13. The radar level gauge system according to claim 10, wherein said dielectric plug is a glass plug fused to an inner surface of said first hollow conductor section to form a glass-to-metal seal between said glass plug and said first hollow conductor.

14. The radar level gauge system according to claim 1, wherein:
said first hollow conductor section is mechanically connected to said second hollow conductor section by a first weld; and
said second hollow conductor section is mechanically connected to said third hollow conductor section by a second weld.

15. The radar level gauge system according to claim 14, wherein:
said first weld is a continuous weld sealingly connecting said first hollow conductor section and said second hollow conductor section; and
said second weld is a continuous weld sealingly connecting said second hollow conductor section and said third hollow conductor section.

16. The radar level gauge system according to claim 1, wherein said feed-through provides a microwave passage in combination with at least one of the structures selected from the group consisting of a flame-proof housing structure according to the standard IEC 60079-1 or corresponding; a zone-separation between equipment protection levels Ga and Gb according to the standard IEC 60079-0; and a single seal according to the standard ANSI/ISA-12.27.01-2011.

17. A radar level gauge system for determining the filling level of a product in a tank, comprising:
a transceiver for generating, transmitting and receiving electromagnetic signals having frequencies defining a frequency band having a frequency bandwidth;
an antenna for radiating an electromagnetic transmit signal towards a surface of the product and for returning an electromagnetic reflection signal resulting from reflection of the electromagnetic transmit signal at the surface back towards said transceiver;
a feed-through connecting said transceiver and said antenna; and
processing circuitry coupled to said transceiver for determining said filling level based on a relation between said transmit signal and said reflection signal,
wherein said feed-through comprises:
a first waveguide section comprising a dielectric plug sealingly arranged in a first hollow conductor section, said dielectric plug having a first dielectric constant, and said first hollow conductor section having a first hollow conductor cross-section configuration selected to only allow propagation in a single propagation mode through said first waveguide section for said frequency band;
a second waveguide section arranged between said transceiver and said first waveguide section to receive said transmit signal from said transceiver and guide said transmit signal towards said first waveguide section, said second waveguide section comprising a second hollow conductor section enclosing a material having a second dielectric constant being lower than said first dielectric constant, wherein said second hollow conductor section has a second hollow conductor cross-section configuration being a scaled replica of said first hollow conductor cross-section configuration, selected to only allow propagation in said single propagation mode through said second waveguide section for said frequency band;
a third waveguide section arranged between said antenna and said first waveguide section to receive said transmit signal from said first waveguide section and guide said transmit signal towards said antenna, said third waveguide section comprising a third hollow conductor section enclosing a material having a third dielectric constant being lower than said first dielectric constant, wherein said third hollow conductor section has a third hollow conductor cross-section configuration being a scaled replica of said first hollow conductor cross-section configuration, selected to only allow propagation in said single propagation mode through said third waveguide section for said frequency band;
a first impedance matching waveguide section arranged between said first waveguide section and said second waveguide section, said first impedance matching waveguide section comprising a dielectric first impedance matching member in direct abutment with a first end of the dielectric plug comprised in said first waveguide section, said first impedance matching member having a fourth dielectric constant being lower than said first dielectric constant and higher than said second dielectric constant; and
a second impedance matching waveguide section arranged between said first waveguide section and said third waveguide section, said second impedance matching waveguide section comprising a dielectric second impedance matching member in direct abutment with a second end of the dielectric plug comprised in said first waveguide section, said second impedance matching member having a fifth dielectric constant being lower than said first dielectric constant and higher than said third dielectric constant.

18. The radar level gauge system according to claim 17, wherein said feed-through provides a microwave passage in combination with at least one of the structures selected from the group consisting of a flame-proof housing structure according to the standard IEC 60079-1 or corresponding; a zone-separation between equipment protection levels Ga and Gb according to the standard IEC 60079-0; and a single seal according to the standard ANSI/ISA-12.27.01-2011.

19. A radar level gauge system for determining the filling level of a product in a tank, comprising:
a transceiver for generating, transmitting and receiving electromagnetic signals having frequencies defining a frequency band having a frequency bandwidth;
an antenna for radiating an electromagnetic transmit signal towards a surface of the product and for returning an electromagnetic reflection signal resulting from reflection of the electromagnetic transmit signal at the surface back towards said transceiver;
a feed-through connecting said transceiver and said antenna; and
processing circuitry coupled to said transceiver for determining said filling level based on a relation between said transmit signal and said reflection signal,
wherein said feed-through comprises:
a first waveguide section comprising a dielectric plug sealingly arranged in a first hollow conductor section, said dielectric plug having a first dielectric constant, and said first hollow conductor section having a first hollow conductor cross-section configuration selected to only allow propagation in a single propagation mode through said first waveguide section for said frequency band;
a second waveguide section arranged between said transceiver and said first waveguide section to receive said transmit signal from said transceiver and guide said transmit signal towards said first waveguide section, said second waveguide section comprising a second hollow conductor section enclosing a material having a second dielectric constant being lower than said first dielectric constant, wherein said second hollow conductor section has a second hollow conductor cross-section configuration selected to only allow propagation in said single propagation mode through said second waveguide section for said frequency band;

a third waveguide section arranged between said antenna and said first waveguide section to receive said transmit signal from said first waveguide section and guide said transmit signal towards said antenna, said third waveguide section comprising a third hollow conductor section enclosing a material having a third dielectric constant being lower than said first dielectric constant, wherein said third hollow conductor section has a third hollow conductor cross-section configuration selected to only allow propagation in said single propagation mode through said third waveguide section for said frequency band;

a first impedance matching waveguide section arranged between said first waveguide section and said second waveguide section, said first impedance matching waveguide section comprising a dielectric first impedance matching member pressed against a first end of the dielectric plug comprised in said first waveguide section, said first impedance matching member having a fourth dielectric constant being lower than said first dielectric constant and higher than said second dielectric constant; and a second impedance matching waveguide section arranged between said first waveguide section and said third waveguide section, said second impedance matching waveguide section comprising a dielectric second impedance matching member pressed against a second end of the dielectric plug comprised in said first waveguide section, said second impedance matching member having a fifth dielectric constant being lower than said first dielectric constant and higher than said third dielectric constant.

20. The radar level gauge system according to claim 19, wherein said feed-through provides a microwave passage in combination with at least one of the structures selected from the group consisting of a flame-proof housing structure according to the standard IEC 60079-1 or corresponding; a zone-separation between equipment protection levels Ga and Gb according to the standard IEC 60079-0; and a single seal according to the standard ANSI/ISA-12.27.01-2011.

21. A radar level gauge system for determining the filling level of a product in a tank, comprising:
a transceiver for generating, transmitting and receiving electromagnetic signals having frequencies defining a frequency band having a frequency bandwidth;
an antenna for radiating an electromagnetic transmit signal towards a surface of the product and for returning an electromagnetic reflection signal resulting from reflection of the electromagnetic transmit signal at the surface back towards said transceiver;
a feed-through connecting said transceiver and said antenna; and
processing circuitry coupled to said transceiver for determining said filling level based on a relation between said transmit signal and said reflection signal,
wherein said feed-through comprises:
a first waveguide section comprising a dielectric plug sealingly arranged in a first hollow conductor section, said dielectric plug having a first dielectric constant, and said first hollow conductor section having a first hollow conductor cross-section configuration selected to only allow propagation in a single propagation mode through said first waveguide section for said frequency band;

a second waveguide section arranged between said transceiver and said first waveguide section to receive said transmit signal from said transceiver and guide said transmit signal towards said first waveguide section, said second waveguide section comprising a second hollow conductor section enclosing a material having a second dielectric constant being lower than said first dielectric constant, wherein said second hollow conductor section has a second hollow conductor cross-section configuration selected to only allow propagation in said single propagation mode through said second waveguide section for said frequency band;

a third waveguide section arranged between said antenna and said first waveguide section to receive said transmit signal from said first waveguide section and guide said transmit signal towards said antenna, said third waveguide section comprising a third hollow conductor section enclosing a material having a third dielectric constant being lower than said first dielectric constant, wherein said third hollow conductor section has a third hollow conductor cross-section configuration selected to only allow propagation in said single propagation mode through said third waveguide section for said frequency band;

a first impedance matching waveguide section arranged between said first waveguide section and said second waveguide section, said first impedance matching waveguide section comprising a dielectric first impedance matching member in direct abutment with a first end of the dielectric plug comprised in said first waveguide section, said first impedance matching member having a fourth dielectric constant being lower than said first dielectric constant and higher than said second dielectric constant; and a second impedance matching waveguide section arranged between said first waveguide section and said third waveguide section, said second impedance matching waveguide section comprising a dielectric second impedance matching member in direct abutment with a second end of the dielectric plug comprised in said first waveguide section, said second impedance matching member having a fifth dielectric constant being lower than said first dielectric constant and higher than said third dielectric constant.

22. The radar level gauge system according to claim 21, wherein:
said dielectric plug extends a first distance in an axial direction of said first waveguide section;
said first impedance matching member extends a second distance, longer than said first distance, in an axial direction of said first impedance matching waveguide section; and
said second impedance matching member extends a third distance, longer than said first distance, in an axial direction of said second impedance matching waveguide section.

23. The radar level gauge system according to claim 21, wherein:
said first impedance matching member exhibits a decreasing cross-sectional area with increasing distance from said first end of the dielectric plug; and said second impedance matching member exhibits a decreasing cross-sectional area with increasing distance from said second end of the dielectric plug.

24. The radar level gauge system according to claim 21, wherein said feed-through provides a microwave passage in combination with at least one of the structures selected from the group consisting of a flame-proof housing structure according to the standard IEC 60079-1 or corresponding; a zone-separation between equipment protection levels Ga and Gb according to the standard IEC 60079-0; and a single seal according to the standard ANSI/ISA-12.27.01-2011.

25. A method of manufacturing a feed-through for a radar level gauge system, comprising the steps of:
providing a composite waveguide section part including a first waveguide section comprising a dielectric plug having a first dielectric constant sealingly arranged in a first hollow conductor section, and a second waveguide section comprising a second hollow conductor section enclosing a material having a second dielectric constant being lower than said first dielectric constant, said first hollow conductor section and said second hollow conductor section being aligned to form a composite hollow conductor section;
providing a third waveguide section part comprising a third hollow conductor section enclosing a material having a third dielectric constant being lower than said first dielectric constant;
aligning said composite hollow conductor section and said third hollow conductor section; and
welding said composite waveguide section part and said third waveguide section part together.

26. The method according to claim 25, wherein the step of providing said composite waveguide section comprises the steps of:
providing a first waveguide section part comprising said dielectric plug sealingly arranged in said first hollow conductor section;
providing a second waveguide section part comprising said second hollow conductor section;
aligning said first hollow conductor section and said second hollow conductor section; and
welding said first waveguide section part and said second waveguide section part together to form said composite waveguide section part having said composite hollow conductor section.

27. The method according to claim 25, wherein:
said second waveguide section part comprises a first recess for receiving said first waveguide section part; and
said third waveguide section part comprises a second recess for receiving said composite waveguide section part.

28. The method according to claim 26, wherein:
said first waveguide section part and said second waveguide section part are welded together along an interface between said first waveguide section part and said first recess; and
said composite waveguide section part and said third waveguide section part are welded together along an interface between said composite waveguide section part and said second recess.

29. The method according to claim 25, further comprising the steps of:
arranging a first impedance matching waveguide section part between said first waveguide section part and said second waveguide section part before welding said first waveguide section part and said second waveguide section part together, said first impedance matching waveguide section part comprising a dielectric first impedance matching member having a fourth dielectric constant being lower than said first dielectric constant and higher than said second dielectric constant; and
arranging a second impedance matching waveguide section part between said composite waveguide section part and said third waveguide section part before welding said composite waveguide section part and said third waveguide section part together, said second impedance matching waveguide section part comprising a dielectric second impedance matching member having a fifth dielectric constant being lower than said first dielectric constant and higher than said third dielectric constant.

* * * * *